United States Patent Office 3,723,142
Patented Mar. 27, 1973

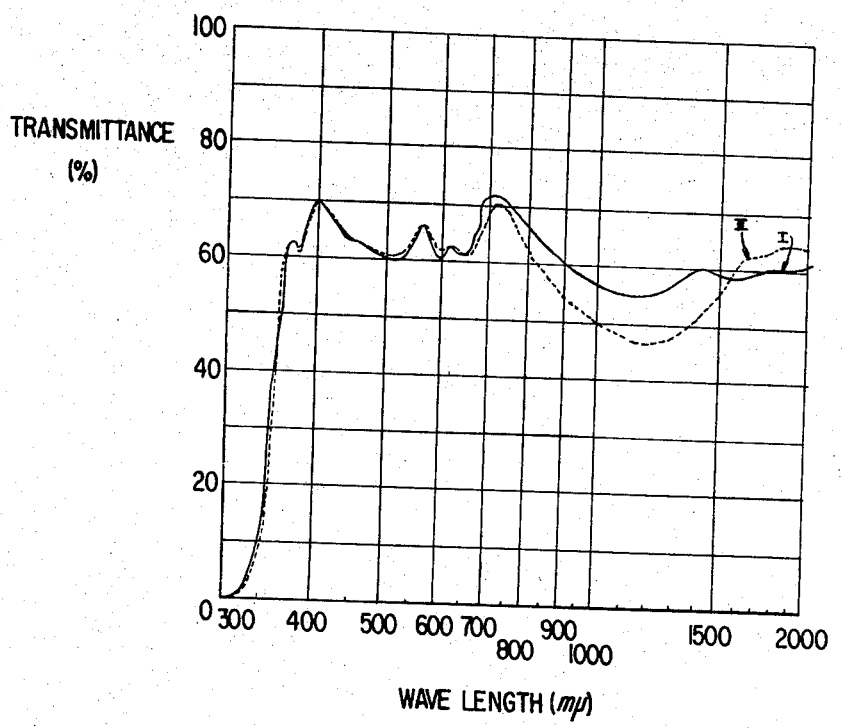

3,723,142
NEUTRAL GRAY GLASS
Shigeki Kato and Takeshi Yamamoto, Yokohama, Japan, assignors to Asahi Glass Company, Ltd., Tokyo, Japan
Filed Dec. 11, 1970, Ser. No. 97,139
Claims priority, application Japan, Dec. 11, 1969, 44/99,056
Int. Cl. C03c 3/06, 1/10, 3/30
U.S. Cl. 106—52     3 Claims

ABSTRACT OF THE DISCLOSURE

A neutral gray colored heat absorbing glass having a low excitation purity consists essentially of the following base components in percent by weight: 68 to 75% $SiO_2$, 0 to 5% $Al_2O_3$, 5 to 15% CaO, 0 to 10% MgO (6 to 15% CaO+MgO), 10 to 18% $Na_2O$, 0 to 5% $K_2O$ (10 to 20% $Na_2O+K_2O$) together with coloring components of 0.1 to 0.5% $Fe_2O_3$, 0.003 to 0.02% CoO, 0.0005 to 0.001% Se, and negligible NiO.

BACKGROUND OF THE INVENTION

Field of the invention

The present invention relates to a neutral gray glass, and more particularly to a neutral gray colored heat absorbing glass which is useful as a window glass for buildings and vehicles, and which has a low excitation purity.

Description of the prior art

When glass is used for building window or vehicle window applications, it is desirable to use a glass which will absorb a substantial portion of the heat from the sun's rays. This reduces the load on the air conditioning systems used for controlling the interior temperatures of the building or vehicle.

The conventional heat absorbing glass has a bluish-green color imparted to it by the incorporation of iron oxide in the glass. In order to provide a neutral gray colored heat absorbing glass, a suitable amount of $Fe_2O_3$, as a heat absorbing component, has been incorporated into the conventional $NaO$-$CaO$-$SiO_2$ glass. This glass, however, is characterized by a bluish-green color caused by the inclusion of the iron oxide. In order to eliminate this undesirable color, suitable ratios of CoO, NiO and Se have been incorporated into this composition. For example, one example of a conventional neutral gray glass for glass sheet is as follows:

| | Wt. percent |
|---|---|
| $SiO_2$ | 72.5 |
| $Al_2O_3$ | 1.6 |
| CaO | 7.0 |
| MgO | 3.9 |
| $SO_3$ | 0.2 |
| $Na_2O$ | 14.5 |
| $Fe_2O_3$ | 0.23 |
| NiO | 0.009 |
| CoO | 0.005 |
| Se | 0.001 |

It is often difficult to adequately control the degree of absorbability and chromativity of these conventional glasses, however, since these parameters depend upon the content of each of the four color components.

Another problem with the conventional neutral gray glass is that during fire-polishing, the NiO is reduced to nickel which shows up as tiny black spots throughout the glass. This occurs since during fire-polishing a ribbon of the glass is moved over the surface of a molten tin bath in a reducing atmosphere, as in the well known "float" process. Any easily reducible component in the glass, such as NiO, will be rapidly reduced during this procedure. Due to the difficulties of practicing the float process on conventional neutral gray glass, heretofore such procedures were not used for these glasses.

Still another difficulty with conventional neutral gray glass is that it is characterized by a somewhat higher than desired excitation purity and a need existed for a glass characterized by a low excitation purity.

SUMMARY OF THE INVENTION

Accordingly, it is an object of this invention to provide a neutral gray colored heat absorbing glass which does not depend upon the presence of NiO to eliminate the bluish-green coloration of $Fe_2O_3$.

Another object of the present invention is to provide a neutral gray colored heat absorbing glass which is characterized by low excitation purity and which has a high weathering resistance and a low tendency to devitrify.

These and other objects have now herein been attained by providing a neutral gray heat adsorbing glass which depends upon the balance of $Fe_2O_3$, CoO, and Se for its coloration. More specifically, these objects have been attained by providing a neutral gray heat absorbing glass having essentially the following composition:

Base components

| | Percent |
|---|---|
| $SiO_2$ | 68–75 |
| $Al_2O_3$ | 0–5 |
| CaO | 5–15 |
| MgO | 0–10 |
| CaO+MgO | 6–15 |
| $Na_2O$ | 10–18 |
| $K_2O$ | 0–5 |
| $Na_2O+K_2O$ | 10–20 |

Coloring components

| | Percent |
|---|---|
| $Fe_2O_3$ | 0.1–0.5 |
| CoO | 0.003–0.02 |
| Se | 0.0005–0.001 |

NiO, negligible

BRIEF DESCRIPTION OF THE DRAWING

The single drawing is a graph showing the spectral transmittance of exemplary samples of the glass composition of the present invention.

DETAILED DESCRIPTION OF THE PREFERRED EMBODIMENTS

The neutral gray colored heat absorbing glass of the present invention consists essentially of the following components in percent by weight:

TABLE I

| Component | Permissive range | Preferable range |
|---|---|---|
| (I) Base component: | | |
| $SiO_2$ | 68–75 | 70–74 |
| $Al_2O_3$ | 0–5 | 1–2 |
| CaO | 5–15 | 5–10 |
| MgO | 0–10 | 1–5 |
| (CaO + MgO) | 6–15 | 8–12 |
| $Na_2O$ | 10–18 | 11–15 |
| $K_2O$ | 0–5 | 0–1 |
| ($Na_2O + K_2O$) | 10–20 | 12–16 |
| (II) Coloring component: | | |
| $Fe_2O_3$ | 0.1–0.5 | 0.18–0.22 |
| CoO | 0.003–0.02 | 0.0031–0.0040 |
| NiO | 0–0.002 | 0–0.0004 |
| Se | 0.0005–0.001 | 0.0006–0.0009 |
| (III) Sub-component: | | |
| $TiO_2$ | 0–0.5 | 0–0.5 |
| $SO_3$ | 0–0.5 | 0–0.5 |
| $Sb_2O_3$ | 0–0.5 | 0–0.5 |
| $As_2O_3$ | 0–0.5 | 0–0.5 |
| Cl | 0–0.5 | 0–0.5 |
| ZnO | 0–0.5 | 0–0.5 |
| $SnO_2$ | 0–0.1 | 0–0.1 |

Good results are obtained when the neutral gray colored heat absorbing glass composition of this invention consists essentially of the following base components in percent by weight: 68 to 75% $SiO_2$, 0 to 5% $Al_2O_3$, 5 to 15% CaO, 0 to 10% MgO, 10 to 18% $Na_2O$, 0 to 5% $K_2O$, wherein CaO+MgO is 6 to 15% and $Na_2O+K_2O$ is 10 to 20%, together with coloring components of 0.18 to 0.22% $Fe_2O_3$, 0.0031 to 0.0040% CoO, 0.0006 to 0.0009% Se, and 0 to 0.0004% NiO.

The main components of this composition include $SiO_2$, alkali metal oxides, alkaline earth metal oxides and $Al_2O_3$ which control the important properties of melting point, formability, viscosity, devitrification and weathering resistance.

The weathering resistance of the glass is inferior if less than 68% $SiO_2$ is present, while the devitrification of the glass can easily occur if more than 75% $SiO_2$ is present. $Na_2O$ and $K_2O$ are fluxes which determine the weathering resistance of the glass. If more than 18% $Na_2O$ or more than 20% $Na_2O+K_2O$ is present, the weathering resistance will be inferior. If less than 10% $Na_2O$ or less than 10% $Na_2O+K_2O$ is present, however, the melting point of the glass will be too low. Moreover, when more than 5% $K_2O$ is present, the melting point of the glass is too high and it is not economical, since $K_2O$ is expensive compared to $Na_2O$. CaO and MgO are also flux materials used for improving the weathering resistance. The weathering resistance of the glass is inferior when less than 5% CaO is present or less than 6% CaO+MgO is present, while devitrification of the glass can occur readily if more than 15% CaO is present, if more than 10% MgO is present, or more than 15% CaO+MgO is present. $Al_2O_3$ is added to adjust the viscosity and to improve the weathering resistance. The melting point of the glass is inferior if more than 5% $Al_2O_3$ is present.

The preferable ranges of each of the components of the present glass composition are stated in the right column of Table I. $Fe_2O_3$ is added to provide a predetermined degree heat absorbability. On the other hand, CoO and Se are combined with $Fe_2O_3$ to provide visible light transmission of neutral gray light.

An excess quantity of green color will be imparted to the glass if the $Fe_2O_3$ is present in an amount of more than 0.5%, while the heat absorbability of the glass with be inferior if the $Fe_2O_3$ is present in an amount of less than 0.1%.

The transmission color of glass can be neutralized by adding 0.003–0.02% CoO and 0.005–0.001% Se. It is preferable to use a negligible quantity of NiO so that the float process can be used. The quantity of NiO should be less than 0.002% and preferably less than 0.0004%. When the qauntity of NiO is maintain below 0.0004%, the difficulties of the prior art glasses treated by the float process will be avoided.

Since the quantity of NiO can be introduced into the glass composition merely as an impurity from the raw materials or an impurity from the surface of the apparatus, case must be taken to avoid such contamination.

The preferable contents of said coloring components are 0.18–0.22% $Fe_2O_3$, 0.031–0.0040% CoO, 0.0006 to 0.0009 Se, and 0–0.0004% NiO. In these ranges, a neutral gray glass is provided having 57–63% luminous transmittance for 5 mm. thickness of the glass sheet, 57–63% solar energy transmittance, less than 580 m$\mu$ of dominant wave length and less than 1.5% of excitation purity.

As shown in Table I, $SO_3$, $Sb_2O_3$, $As_2O_3$, or Cl can be added as refining agents, and/or $TiO_2$, ZnO and $SnO_2$ can be added as color controlling agents or stabilizers. Moreover, other sub-components can be added for specialty purposes.

The glass of the present invention can be produced by conventional processes in which the components are admixed in accordance with the object glass composition, and are melted, formed and annealed.

The glass composition of the present invention was found to be substantially free from black spots and is characterized by a low excitation purity, i.e., up to 1.5%, high weathering resistance and reduced devitrification.

Having generally described the invention, a further understanding can be obtained by reference to certain specific examples which are provided herein for purposes of illustration only and are not intended to be limiting in any manner.

EXAMPLES I and II

The following are exemplary glass compositions with resultant physical properties:

| | I | II |
|---|---|---|
| Component: | | |
| $SiO_2$, wt. percent | 72.2 | 72.5 |
| $Al_2O_3$ | 1.74 | 1.70 |
| CaO | 6.97 | 6.93 |
| MgO | 3.88 | 3.88 |
| $Na_2O$ and $K_2O$ | 14.8 | 14.5 |
| $Fe_2O_3$ | 0.204 | 0.222 |
| NiO | 0.0014 | |
| CoO | 0.0035 | 0.0034 |
| Se | 0.00081 | 0.00077 |
| $SO_3$ | 0.20 | 0.22 |
| $TiO_2$ | 0.02 | 0.03 |
| Property: | | |
| Luminous transmittance, percent | 62.4 | 62.8 |
| Solar energy transmittance, percent | 60.2 | 57.5 |
| Dominant wave length, m$\mu$ | 519 | 542.5 |
| Excitation purity, percent | 0.57 | 0.5 |

The spectral transmittance curve of the samples of I and II (5 mm. thickness in calculation) are respectively shown in the drawing. It is found that they have substantially uniform light transmission in the range of 440–660 m$\mu$, and are characterized by a neutral gray color.

Flat glass ribbons are produced from each of the glass samples I and II by the float process and without the occurrence of black spots.

In accordance with this invention, a neutral gray colored heat absorbing glass having high weathering resistance, less devitrification and low excitation purity and uniform light transmission can be provided.

Having now fully described the invention, it will be apparent to one of ordinary skill in the art that many changes and modifications can be made thereto without departing from the spirit or scope of the invention.

Accordingly, what is claimed as new and intended to be covered by Letters Patent of the United States is:

1. A neutral gray colored heat absorbing glass consisting essentially of the following base components in percent by weight: 68 to 75% $SiO_2$, 0 to 5% $Al_2O_3$, 5 to 15% CaO, 0 to 10% MgO, 10 to 18% $Na_2O$, 0 to 5% $K_2O$, wherein CaO+MgO is 6 to 15% and $Na_2O+K_2O$ is 10 to 20%, together with coloring components of 0.18 to 0.22% $Fe_2O_3$ 0.0031 to 0.0040% CoO, 0.0006 to 0.0009% Se, and 0–0.0004% NiO.

2. The glass of claim 1, wherein said base components consist of 70 to 74% $SiO_2$, 1 to 2% $Al_2O_3$, 5 to 10% CaO, 1 to 5% MgO, 11 to 15% $Na_2O$, 0 to 1% $K_2O$, wherein CaO+MgO is 8 to 12% and $Na_2O+K_2O$ is 12 to 16%, and which is characterized by a high weathering resistance, reduced devitrification and an excitation purity of up to 1.5%.

3. The glass of claim 2 which has been fire-polished under reducing conditions by the float method and which is characterized by the absence of black spots.

References Cited

UNITED STATES PATENTS

| Re. 25,312 | 1/1963 | Duncan et al. | 106—52 |
| 2,892,726 | 6/1959 | Smith et al. | 106—52 |
| 2,901,366 | 8/1959 | Smith et al. | 106—52 |
| 3,296,004 | 1/1967 | Duncan | 106—52 |

HELEN M. McCARTHY, Primary Examiner

M. L. BELL, Assistant Examiner

U.S. Cl. X.R.

65—32, 99 A